US007261365B2

(12) United States Patent
Dickson et al.

(10) Patent No.: US 7,261,365 B2
(45) Date of Patent: Aug. 28, 2007

(54) VEHICLE BODY MOUNT ASSEMBLY

(75) Inventors: Daniel G. Dickson, West Bloomfield, MI (US); Anand Huprikar, Novi, MI (US); Thomas E. St. Henry, Ann Arbor, MI (US); William G. Dieter, Taylor, MI (US)

(73) Assignee: BASF Corporation, Florham Park, NJ (US)

(*) Notice: Subject to any disclaimer, the term of this patent is extended or adjusted under 35 U.S.C. 154(b) by 74 days.

(21) Appl. No.: 11/075,554

(22) Filed: Mar. 9, 2005

(65) Prior Publication Data

US 2006/0202515 A1 Sep. 14, 2006

(51) Int. Cl.
*B60J 7/00* (2006.01)

(52) U.S. Cl. ............................ 296/190.07; 267/141.4; 267/293; 248/635

(58) Field of Classification Search ........... 296/190.07; 267/141.2, 141.4, 141.5, 293, 294; 248/569, 248/635, 638

See application file for complete search history.

(56) References Cited

U.S. PATENT DOCUMENTS 2,720,374 A 10/1955 Hutton
3,128,999 A 4/1964 Schmitt
3,350,042 A 10/1967 Stewart et al.
3,479,081 A 11/1969 Schaaf
3,532,319 A 10/1970 Brown
3,622,194 A 11/1971 Bryk
3,809,427 A 5/1974 Bennett
4,298,193 A 11/1981 Mourray
4,306,708 A 12/1981 Gassaway et al.
4,478,396 A 10/1984 Kawaura
4,521,004 A 6/1985 Caldwell
4,530,491 A 7/1985 Bucksbee
4,720,075 A 1/1988 Peterson et al.
4,783,039 A 11/1988 Peterson et al.
5,170,985 A * 12/1992 Killworth et al. ........... 248/635
5,178,433 A 1/1993 Wagner
5,295,671 A 3/1994 Nakagaki et al.
5,388,884 A 2/1995 Keehner et al.
5,409,283 A 4/1995 Ban
5,516,176 A 5/1996 Kimoto et al.
5,799,930 A * 9/1998 Willett .................... 267/141.4
5,820,115 A 10/1998 Stevenson et al.

(Continued)

FOREIGN PATENT DOCUMENTS

JP 61-45124 5/1986

*Primary Examiner*—Lori L. Lyjak
(74) *Attorney, Agent, or Firm*—Fernando A. Borrego

(57) ABSTRACT

A mount assembly having a first carrier and a first insulator disposed about the first carrier for isolating movement of a frame relative to a vehicle body in a first direction. A second carrier engages the first carrier for coupling the second carrier to the first carrier. A second insulator is disposed about the second carrier for further insolating the movement of the frame relative to the vehicle body in the first direction. A sleeve is disposed about both of the first and second carriers and is coupled to the first carrier. The sleeve is formed of an elastomeric material for isolating movement of the frame relative to the vehicle body in a second direction transverse to the first direction such that the isolation of movement about the first and second directions are accomplished by separate and independent components of the assembly.

20 Claims, 4 Drawing Sheets

U.S. PATENT DOCUMENTS

| | | | |
|---|---|---|---|
| 5,915,775 | A | 6/1999 | Martin et al. |
| 6,138,980 | A | 10/2000 | Farbotnik |
| 6,170,812 | B1 | 1/2001 | Nicoles |
| 6,361,096 | B2 | 3/2002 | Kim |
| 6,364,296 | B1 | 4/2002 | Cummings et al. |
| 6,416,102 | B1 | 7/2002 | Howard |
| 6,427,989 | B1 | 8/2002 | Hashimoto et al. |
| 6,471,179 | B1 | 10/2002 | Tousi et al. |
| 6,910,671 | B1 * | 6/2005 | Norkus et al. .............. 248/635 |
| 2002/0121293 | A1 | 9/2002 | Rice |
| 2005/0073166 | A1 | 4/2005 | Snyder |

* cited by examiner

VEHICLE BODY MOUNT ASSEMBLY

BACKGROUND OF THE INVENTION

1. Field of the Invention

The subject invention relates to a mount assembly for a vehicle having a frame and a vehicle body wherein movements of the frame relative to the vehicle body in various directions are isolated by separate and independent components of the mount assembly.

2. Description of Related Art

Mount assemblies for vehicles are well known in the art. Examples of such assemblies are shown in U.S. Pat. Nos. 3,809,427; 4,286,777; and 6,361,096. Each of these assemblies include upper and lower insulators for coupling a frame of the vehicle to a vehicle body. The insulators are typically formed of an elastomeric material such as rubber. Washers or flanges are provided on outward surfaces of the insulators and a fastener interconnects the washers or flanges to the vehicle body for sandwiching the insulators between the washers or flanges and for coupling the frame to the vehicle body. A metallic tube or sleeve can be disposed between the washers or flanges to provide structural support and to provide a passageway for the fastener.

The prior art mount assemblies, with the above described characteristics, can operate effectively. However, this construction has limitations. The forces and movement of the frame relative to the vehicle body are frequently transmitted in multiple directions. In particular, the movement of the frame relative to the vehicle body can be transverse to the general plane of the frame and vehicle body, i.e., vertical. Further, the movement of the frame relative to the vehicle body can be parallel with the general plane of the frame and vehicle body, i.e., horizontal or fore, aft, and/or lateral. Of course, the movement of the frame relative to the vehicle body is also frequently some combination thereof. Each insulator of the prior art mount assemblies are designed to isolate movement in both directions. In other words, the vertical movement and the fore, aft, and/or lateral movement is intertwined in these insulators. The design of each of the insulators is therefore a compromise between the optimal design for isolating vertical movement and the optimal design for isolating fore, aft, and/or lateral movement. Hence, the designs of the prior art mount assemblies cannot be finely tuned and the versatility of these mount assemblies is limited.

Accordingly, it would be advantageous to develop a mount assembly that can have greater flexibility, can be tuned to meet optimal design criteria, and continues to adequately isolate movement of a frame relative to a vehicle body.

SUMMARY OF THE INVENTION AND ADVANTAGES

A mount assembly for use with a vehicle having a frame and a vehicle body. The assembly comprises a first carrier having a first flange and a first tube and adapted to be coupled to the frame of the vehicle. A first insulator is disposed about the first tube and coupled to the first flange of the first carrier. A second carrier has a second flange and a second tube with the second tube engaging the first tube. A second insulator is disposed about the second tube and coupled to the second flange of the second carrier. A sleeve is disposed about both of the first and second tubes and is coupled to the first flange with the sleeve being formed of an elastomeric material.

Accordingly, the subject invention isolates movement in multiple directions using separate and independent components. The design of the subject invention creates a mount assembly having greater design flexibility wherein the vertical, fore, aft, and/or lateral spring rates of the mount assembly can be independently tuned to meet optimal design criteria.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
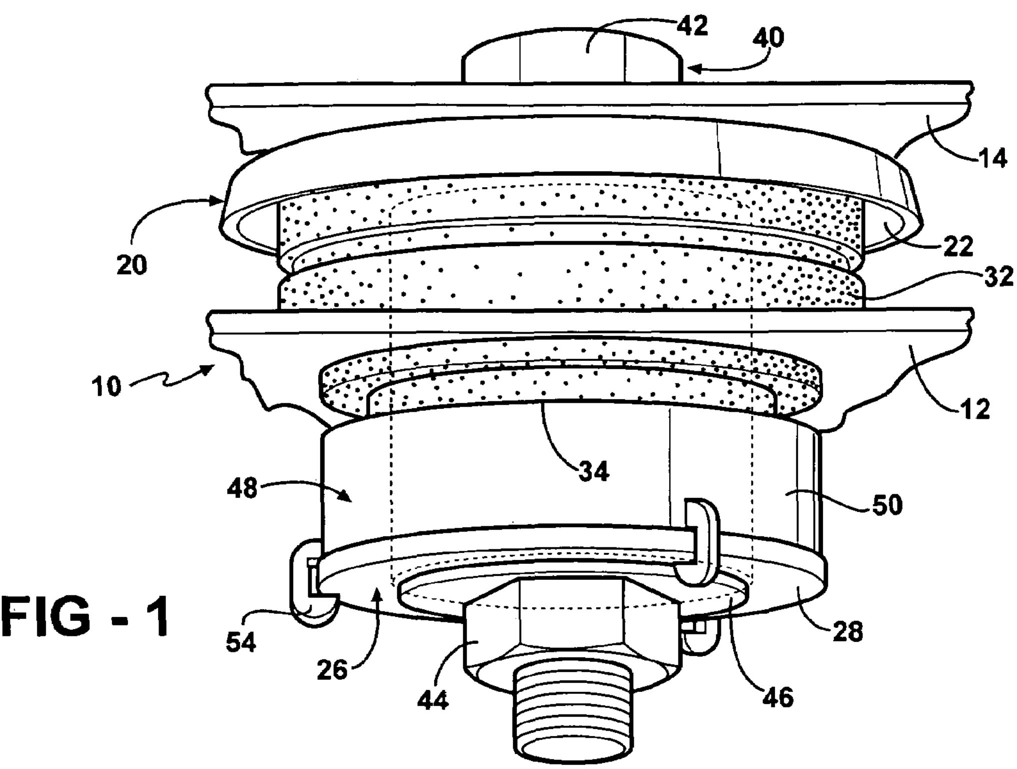
FIG. 1 is a perspective view of a mount assembly in accordance with the subject invention.
Figure 3:
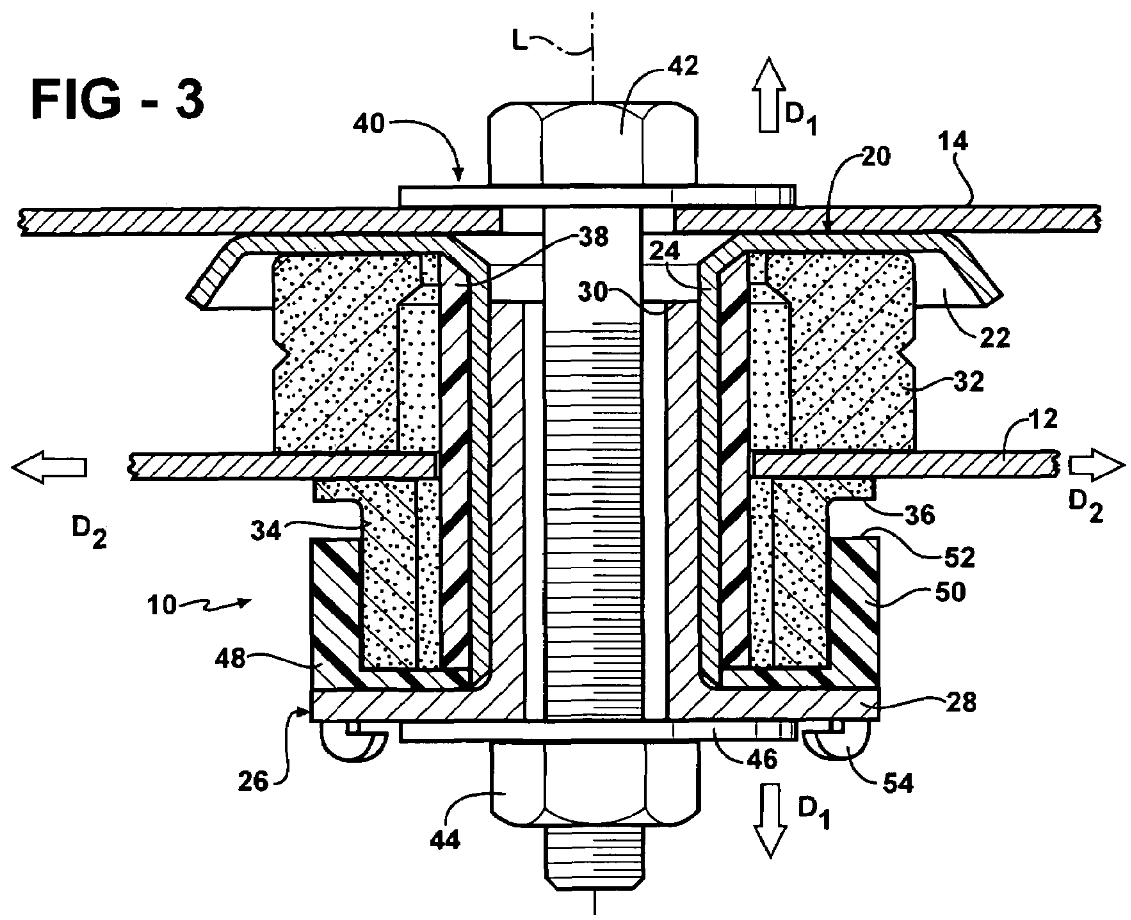
FIG. 3 is a cross-sectional view of the mount assembly.
Figure 2:
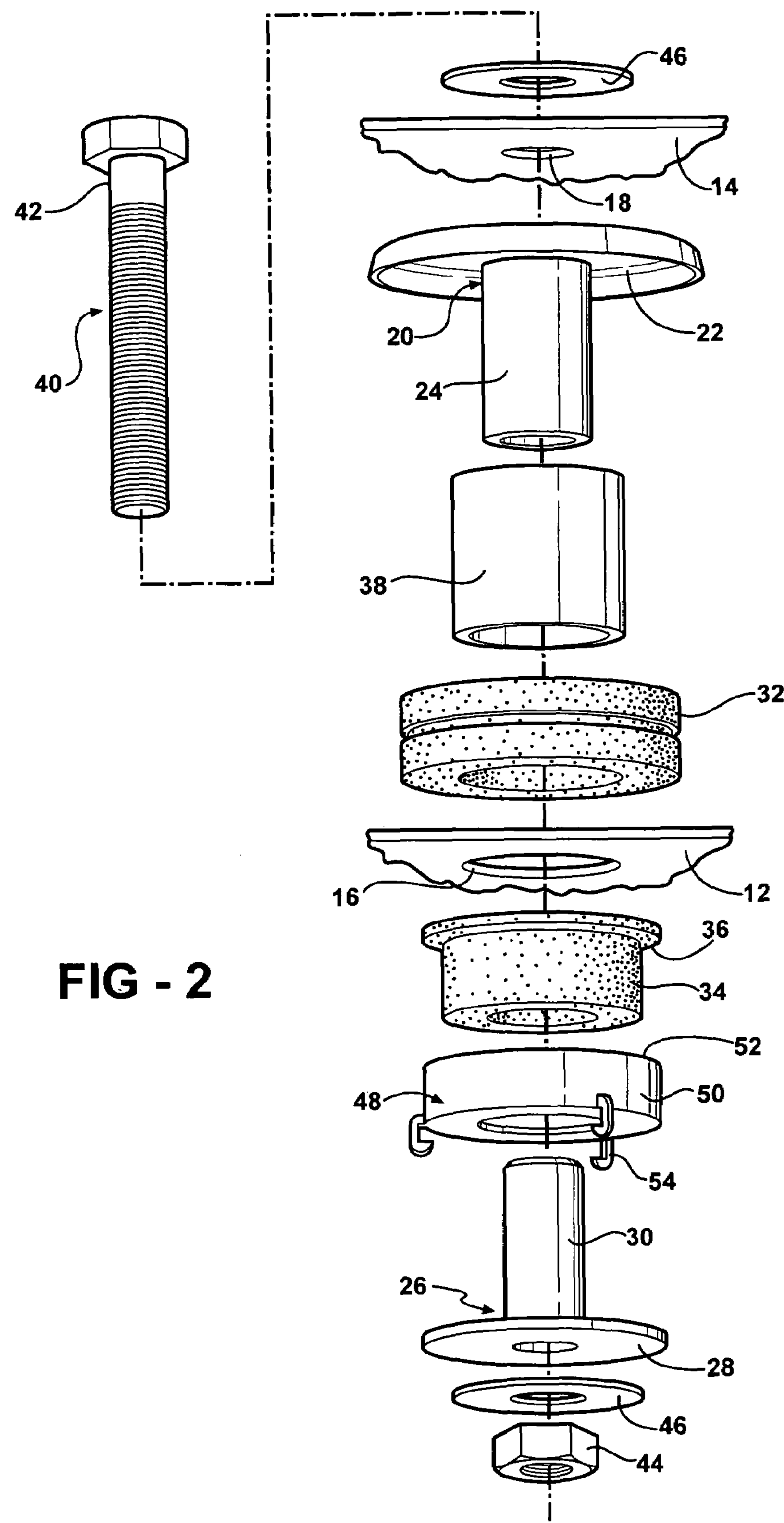
FIG. 2 is an exploded perspective view of the mount assembly.

Referring to the Figures, wherein like numerals indicate like or corresponding parts throughout the several views, a mount assembly is generally shown at 10 in FIGS. 1-3. The mount assembly 10 is shown in a rest state in FIGS. 1 and 3. In the preferred embodiment, the mount assembly 10 is for use with a vehicle having a frame 12 and a vehicle body 14. Both the frame 12 and vehicle body 14 include apertures 16, 18 that will be discussed in greater detail below. For illustrative purposes, only a small fragment of the frame 12 and vehicle body 14 are shown in the Figures. The frame 12 and vehicle body 14 can be of any suitable design or configuration without deviating from the scope of the subject invention.

The mount assembly 10 includes a first carrier 20 having a first flange 22 and a first tube 24. The first carrier 20 is adapted to be coupled to the frame 12 of the vehicle with the first tube 24 extending through the aperture 16 in the frame 12. The first carrier 20 is preferably formed of a metallic material such as steel. The mount assembly 10 also includes a second carrier 26 having a second flange 28 and a second tube 30 with the second tube 30 engaging the first tube 24 for joint coupling the second carrier 26 to the first carrier 20 and to the frame 12 of the vehicle. The second tube 30 also extends through the aperture 16 in the frame 12 and the second carrier 26 is also preferably formed of a metallic material such as steel. Preferably, the second tube 30 of the second carrier 26 is telescopingly received within the first tube 24 of the first carrier 20 for coupling the second carrier 26 to the first carrier 20. As illustrated in FIGS. 1-3, the first carrier 20 is located at a top of the assembly 10 with the first flange 22 above the frame 12 and the second carrier 26 is located at a bottom of the assembly 10 with the second flange 28 below the frame 12.

A first insulator 32 is disposed about the first tube 24 and coupled to the first flange 22 of the first carrier 20 for preferably isolating movement of the frame 12 relative to the vehicle body 14 in a first direction $D_1$. In the embodiment shown in FIG. 1, the first insulator 32 abuts the first flange 22. A second insulator 34 is disposed about the second tube 30 and coupled to the second flange 28 of the second carrier 26 for further insolating the movement of the frame 12 relative to the vehicle body 14 in the first direction $D_1$. The second insulator 34 can include a ledge 36 extending outwardly therefrom. The purpose of the ledge 36 will be discussed in detail below. Preferably, the first 32 and second 34 insulators are formed of an elastomeric material. Even more preferably, the first 32 and second 34 insulators are formed of micro-cellular polyurethane.

As shown in FIG. 3, the frame 12 of the vehicle is displaceable relative to the carriers 20, 26 and vehicle body 14 along a line of travel L. The first direction $D_1$, as indicated by the arrow $D_1$, is substantially parallel to the line of travel L. As orientated in the Figures, the first direction $D_1$ is in a vertical direction. It should be appreciated that the nomenclature of the frame 12 being displaced relative to the vehicle body 14 is purely for descriptive purposes and depending upon the point of reference, the vehicle body 14 could be displaceable relative to the frame 12.

Referring to FIGS. 2 and 3, a sleeve 38 is disposed about both of the first 24 and second 30 tubes and is coupled to the first flange 22. At a minimum, the sleeve 38 extends from a first end across the aperture 16 in the frame 12 to a second end. In the embodiment illustrated, the first end is coupled to the first flange 22 and the second end coupled to the second flange 28. The sleeve 38 is therefore sandwiched between the flanges 22, 28 for preventing translation of forces into the sleeve 38 during the movement of the frame 12 relative to the vehicle body 14 in the first direction $D_1$. The sleeve 38 is formed of an elastomeric material for isolating movement of the frame 12 relative to the vehicle body 14 in a second direction $D_2$ transverse to the first direction $D_1$. It should be appreciated that the sleeve 38 may be of any suitable height or configuration so long as the frame 12 can be adequately isolated relative to the vehicle body 14 in the second direction. The second direction $D_2$, as indicated by the arrow $D_2$, is substantially transverse to the line of travel L. As orientated in the Figures, the second direction $D_2$ is in a fore/aft or lateral direction. Preferably, the sleeve 38 is formed of a polyurethane elastomer. Even more preferably, the sleeve 38 is formed of thermoplastic or thermoset polyurethane. Alternatively, the sleeve 38 could be formed of rubber or any other suitable elastomeric material.

As best shown in FIG. 3, the first 32 and second 34 insulators remain disposed above and below the frame 12 and do not extend through the aperture 16 of the frame 12. Hence, only the first 24 and second 30 tubes and the sleeve 38 extend through the aperture 16. The sleeve 38 preferably surrounds the first tube 24 of the first carrier 20 such that the sleeve 38 operates as another insulator disposed between the tubes 24, 30 of the carriers 20, 26 and the frame 12 independently from the first 32 and second 34 insulators. The isolation of movement about the first $D_1$ and second $D_2$ directions are therefore accomplished by separate and independent components of the mount assembly 10. Of course, angular movement of the frame 12 relative to the line of travel L will be isolated by a combination of the first 32 and second 34 insulators and the sleeve 38. Although the sleeve 38 is shown having a substantially tubular configuration, the sleeve 38 may be shaped into a variety of configurations to further enhance the versatility of the mount assembly 10. The concept of the subject mount assembly 10 de-couples the insulators 32, 34 and the sleeve 38 such that a variety of different materials and configurations can be used to obtain a wide range of desired performances in any direction.

A fastener 40 interconnects the first carrier 20 to the second carrier 26 and secures both carriers 20, 26 to the vehicle body 14. Through the interconnection of the first 20 and second 26 carriers by the fastener 40, the first 22 and second 28 flanges sandwich the sleeve 38 therebetween such that the vehicle body 14, first 20 and second 26 carriers, sleeve 38, and fastener 40 move in unison with the movement of the vehicle body 14 relative to the frame 12. The fastener 40 is illustrated as a bolt 42 having a nut 44 wherein the nut 44 is threaded onto the bolt 42 on an opposing side of the vehicle body 14. A washer 46 is provided at a top of the fastener 40 adjacent the vehicle body 14 and at a bottom of the fastener 40 adjacent the second carrier 26. It should be appreciated that the fastener 40 may be of any suitable design or configuration. Also, the bolt 42 and nut 44 could be inverted such that the nut 44 abuts the vehicle body 14.

In the preferred embodiment, a cup 48, which is formed of an elastomeric material, abuts the second flange 28 of the second carrier 26. The cup 48 includes a wall 50 extending away from the second flange 28 that defines an abutment end 52. The second insulator 34 preferably abuts the cup 48 for coupling the second insulator 34 to the second flange 28. The wall 50 at least partially surrounds the second insulator 34 for further coupling the second insulator 34 to the second flange 28. The cup 48 is configured to provide a press fit between the cup 48 and the second insulator 34 such that the second insulator 34 remains attached to the cup 48 during installation of the second carrier 26. The abutment end 52 of the wall 50 selectively engages the ledge 36 of the second insulator 34 during excessive movement of the frame 12 relative to the vehicle body 14 in the first direction $D_1$. This engagement further isolates movement of the frame 12 relative to the vehicle body 14. It should be appreciated that the wall 50 of the cup 48 could be eliminated without deviating from the scope of the subject invention.

The cup 48 includes a plurality of retaining tabs 54 engaging the second flange 28 to interconnect the cup 48 to the second carrier 26. The cup 48 will therefore remain secured to the second carrier 26 during installation of the second carrier 26 to the assembly 10. The cup 48 is preferably formed of a thermoplastic or thermoset polyurethane. In the embodiment of FIGS. 1-3, the first end of the sleeve 38 abuts the first flange 22 and the second end of the sleeve 38 abuts a portion of the cup 48 to sandwich the sleeve 38 between the first 20 and second 26 carriers. Specifically, the second end of the sleeve 38 abuts the portion of the cup 48 adjacent the first tube 24.

Figure 4:
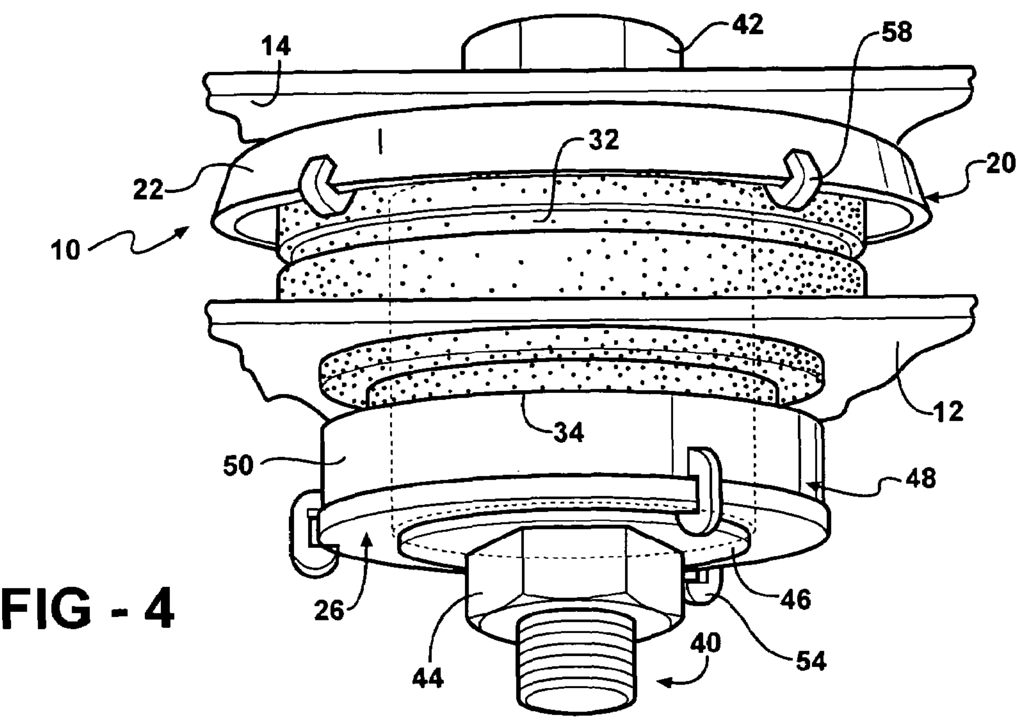
FIG. 4 is a perspective view of an alternative mount assembly in accordance with the subject invention.
Figure 6:
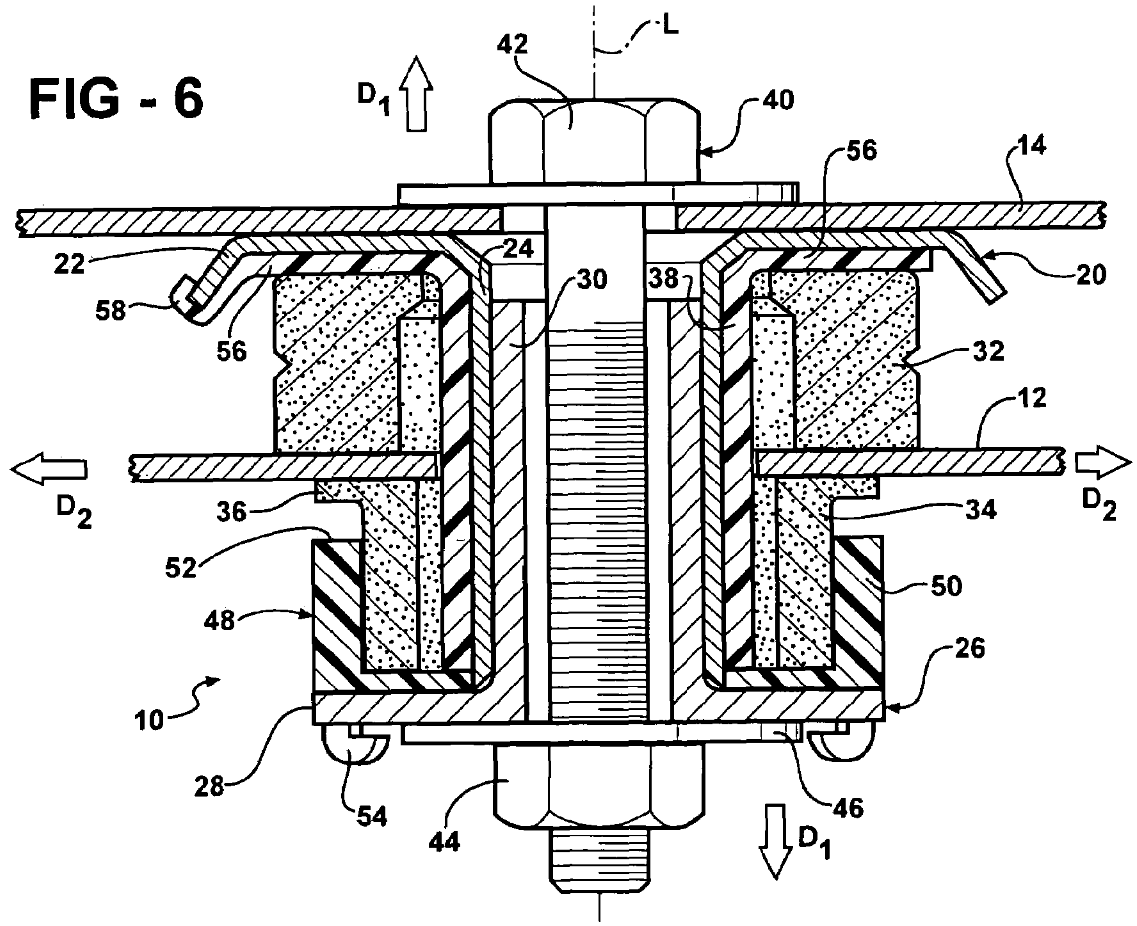
FIG. 6 is a cross-sectional view of the mount assembly of FIG. 4.
Figure 5:
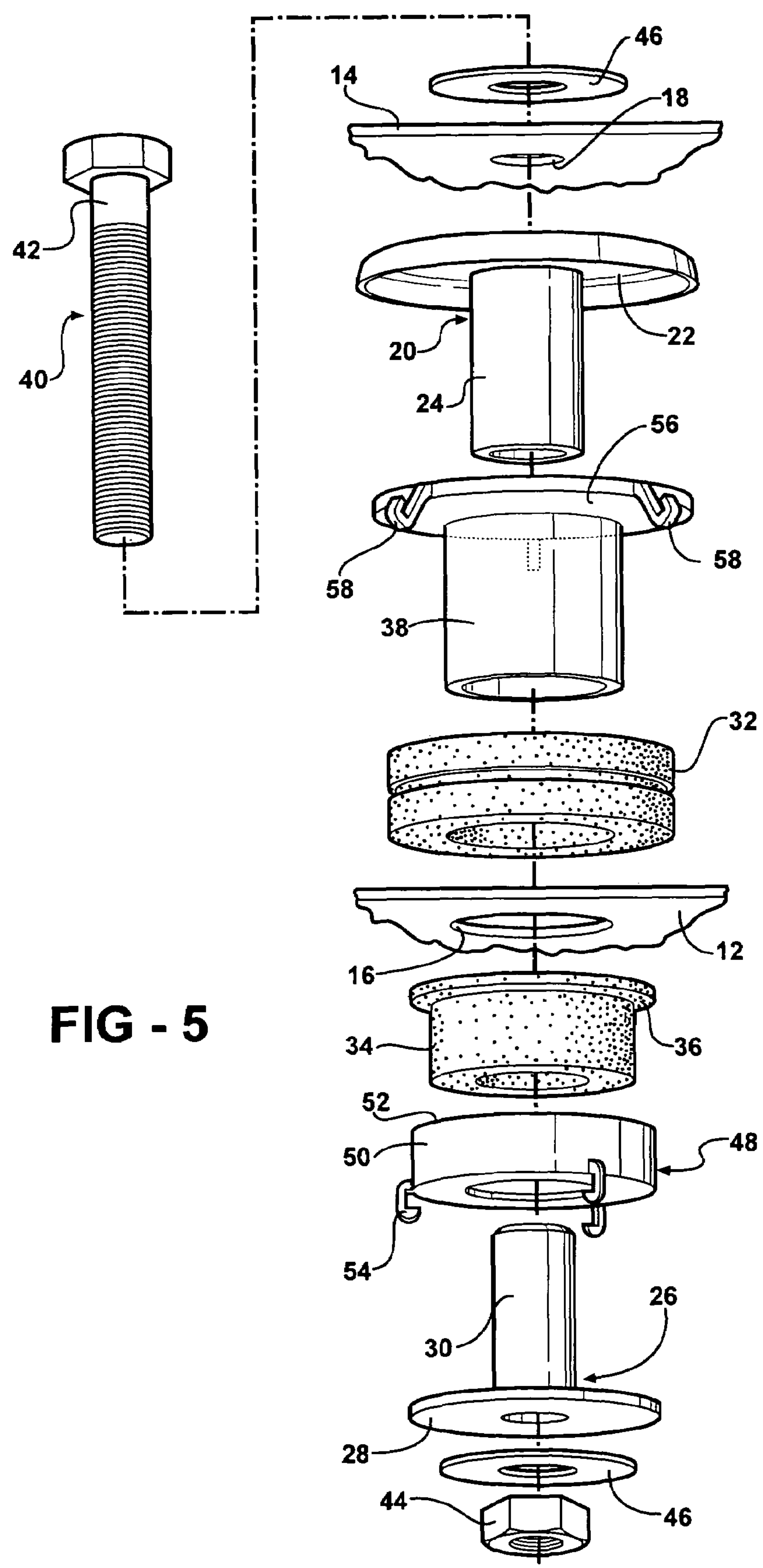
FIG. 5 is an exploded perspective view of the mount assembly of FIG. 4.

Turning to FIGS. 4-6, an alternative embodiment of the mount assembly 10 is shown. This embodiment includes a number of the same features as the embodiment of FIGS. 1-3. In particular, this embodiment includes similar carriers 20, 26, insulators 32, 34, fastener 40, and cup 48. The sleeve 38 is also substantially similar. However, an extension 56, which is formed of an elastomeric material, abuts the first flange 22 of the first carrier 20. Preferably, the extension 56 is integrally connected to and extends from the sleeve 38. The extension 56 has a contour substantially similar to the configuration of the first flange 22. The extension 56 and sleeve 38 are also preferably formed of a common homogenous material, such as thermoplastic or thermoset polyurethane. The extension 56 includes a plurality of retaining tabs 56 engaging the first flange 22 to interconnect the extension 56 to the first carrier 20. As such, the extension 56 and sleeve 38 remain attached to the first carrier 20 during installation of the first carrier 20 into the assembly 10. In this embodiment, the first insulator 32 abuts the extension 56 for coupling the first insulator 32 to the first flange 22.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A mount assembly for use with a vehicle having a frame and a vehicle body, said assembly comprising:

- a first carrier having a first flange and a first tube and adapted to be coupled to the frame of the vehicle;
- a first insulator disposed about said first tube and coupled to said first flange of said first carrier;
- a second carrier having a second flange and a second tube with said second tube engaging said first tube;
- a second insulator disposed about said second tube and coupled to said second flange of said second carrier; and
- a sleeve disposed about both of said first and second tubes and coupled to said first flange with said sleeve being formed of an elastomeric material.

2. An assembly as set forth in claim 1 wherein said sleeve includes a first end coupled to said first flange with a second end coupled to said second flange to sandwich said sleeve between said flanges for preventing translation of forces into said sleeve during said movement of the frame relative to the vehicle body in a first direction and for isolating movement of the frame relative to the vehicle body in a second direction transverse to the first direction such that said isolation of movement about said first and second directions are accomplished by separate and independent components of said assembly.

3. An assembly as set forth in claim 1 wherein said sleeve is formed of a polyurethane elastomer.

4. An assembly as set forth in claim 3 wherein said sleeve is formed of thermoplastic polyurethane.

5. An assembly as set forth in claim 1 wherein said sleeve is formed of rubber.

6. An assembly as set forth in claim 1 wherein said first and second carriers are formed of a metallic material.

7. An assembly as set forth in claim 6 wherein said second tube of said second carrier is telescopingly received within said first tube of said first carrier for coupling said second carrier to said first carrier.

8. An assembly as set forth in claim 7 wherein said sleeve surrounds said first tube of said first carrier.

9. An assembly as set forth in claim 1 wherein said first and second insulators are formed of an elastomeric material.

10. An assembly as set forth in claim 9 wherein said first and second insulators are formed of micro-cellular polyurethane.

11. An assembly as set forth in claim 1 further including a cup formed of an elastomeric material abutting said second flange of said second carrier with said second insulator abutting said cup for coupling said second insulator to said second flange.

12. An assembly as set forth in claim 11 wherein said cup includes a wall at least partially surrounding said second insulator for further coupling said second insulator to said second flange.

13. An assembly as set forth in claim 12 wherein said second insulator includes a ledge extending outwardly therefrom and said wall of said cup defines a flange for selectively engaging said ledge during excessive movement of the frame relative to the vehicle body in a first direction.

14. An assembly as set forth in claim 11 wherein said cup includes a plurality of retaining tabs engaging said second flange to interconnect said cup to said second carrier.

15. An assembly as set forth in claim 11 further including an extension formed of an elastomeric material abutting said first flange of said first carrier with said first insulator abutting said extension for coupling said first insulator to said first flange.

16. An assembly as set forth in claim 15 wherein said extension is integrally connected to and extends from said sleeve.

17. An assembly as set forth in claim 16 wherein said extension and said sleeve are formed of a thermoplastic polyurethane.

18. An assembly as set forth in claim 16 wherein said extension includes a plurality of retaining tabs engaging said first flange to interconnect said extension to said first carrier.

19. An assembly as set forth in claim 11 wherein said first end of said sleeve abuts said first flange and said second end of said sleeve abuts a portion of said cup to sandwich said sleeve between said first and second carriers.

20. An assembly as set forth in claim 1 wherein said first insulator abuts said first flange.

* * * * *